US012619750B2

(12) United States Patent (10) Patent No.: US 12,619,750 B2
Jahagirdar et al. (45) Date of Patent: May 5, 2026

(54) INGESTION LAYER FOR IMPROVED SECURITY OF DISTRIBUTED INFORMATION

(71) Applicant: Bank of America Corporation, Charlotte, NC (US)

(72) Inventors: Pradeep Jahagirdar, Princeton, NJ (US); Christopher Edwards, Weston, CT (US); Sanjay Dua, Pennington, NJ (US)

(73) Assignee: Bank of America Corporation, Charlotte, NC (US)

( * ) Notice: Subject to any disclaimer, the term of this patent is extended or adjusted under 35 U.S.C. 154(b) by 565 days.

(21) Appl. No.: 17/968,089

(22) Filed: Oct. 18, 2022

(65) Prior Publication Data

US 2024/0126902 A1 Apr. 18, 2024

(51) Int. Cl.
*G06F 21/62* (2013.01)
(52) U.S. Cl.
CPC ................................. *G06F 21/6218* (2013.01)
(58) Field of Classification Search
CPC .................................................. G06F 21/6218
See application file for complete search history.

(56) References Cited

U.S. PATENT DOCUMENTS

| | | | |
|---|---|---|---|
| 11,385,814 | B2 | 7/2022 | Ding |
| 11,392,315 | B1 | 7/2022 | Cady |
| 11,392,557 | B1 | 7/2022 | Fuller et al. |
| 11,398,988 | B1 | 7/2022 | Khadiwala et al. |
| 11,403,189 | B2 | 8/2022 | Wang et al. |
| 11,409,720 | B2 | 8/2022 | Keymolen et al. |
| 11,455,290 | B1 | 9/2022 | Brahmadesam et al. |
| 11,461,027 | B2 | 10/2022 | Gupta |
| 11,461,262 | B2 | 10/2022 | Li |

(Continued)

OTHER PUBLICATIONS

"GitHub language support" Article dated Jun. 24, 2021 as verified by Internet Archive (2 pages) https://web.archive.org/web/20210624032528/https://docs.github.com/en/get-started/learning-about-github/github-language-support#core-languages-supported-by-github-features (Year: 2021).*

(Continued)

*Primary Examiner* — Joseph P Hirl
*Assistant Examiner* — Thomas A Gyorfi
(74) *Attorney, Agent, or Firm* — Banner & Witcoff, Ltd.

(57) ABSTRACT

Aspects of the disclosure relate to information security. A computing platform may configure a connector framework to: preconfigure identities of data production systems without involvement of a third party system, and ingest information, received from the data production systems, directly into a storage layer at each of a plurality of data recipient systems, where the information may be received in a plurality of different programming languages, and the plurality of data production systems may be located in different geographic regions. The computing platform may receive, at the connector framework and from a first data production system of the data production systems, first information. The computing platform may ingest the first information by:

(Continued)

replicating, using the connector framework, the first information, and making available, to the plurality of data recipient systems, the first information, which may cause storage of the replicated first information in real time.

18 Claims, 5 Drawing Sheets

(56)                References Cited

U.S. PATENT DOCUMENTS

| | | | |
|---|---|---|---|
| 11,463,113 B2 | 10/2022 | Medard et al. | |
| 11,467,746 B2 | 10/2022 | Knauft et al. | |
| 11,467,908 B2 | 10/2022 | Nakagawa et al. | |
| 11,468,015 B2 | 10/2022 | Lakshman et al. | |
| 11,470,056 B2 | 10/2022 | Lakshman et al. | |
| 12,229,642 B2 * | 2/2025 | Dirac | G06N 20/00 |
| 2018/0260125 A1 * | 9/2018 | Botes | G06F 11/3006 |
| 2021/0158074 A1 * | 5/2021 | Wray | G06Q 10/1053 |
| 2021/0250358 A1 * | 8/2021 | Dumitru | H04L 67/1097 |
| 2022/0222155 A1 | 7/2022 | Kamran et al. | |
| 2022/0245485 A1 | 8/2022 | Cady | |
| 2022/0247812 A1 | 8/2022 | Mehta et al. | |
| 2022/0278821 A1 | 9/2022 | Resch et al. | |
| 2022/0308794 A1 | 9/2022 | Fukatani et al. | |
| 2022/0317882 A1 | 10/2022 | Vijayan et al. | |
| 2023/0090079 A1 * | 3/2023 | Bruno | G06F 9/547 |
| | | | 717/170 |
| 2023/0252041 A1 * | 8/2023 | Slember | G06F 16/27 |
| | | | 707/620 |

OTHER PUBLICATIONS

"Searching code" Article dated May 19, 2021 as verified by Internet Archive (5 pages) https://web.archive.org/web/20210519081105/https://docs.github.com/en/github/searching-for-information-on-github/searching-code#search-by-language (Year: 2021).*

"Creating and highlighting code blocks" Article dated Jul. 3, 2021 as verified by Internet Archive (3 pages) https://web.archive.org/web/20210703013414/https://docs.github.com/en/github/writing-on-github/working-with-advanced-formatting/creating-and-highlighting-code-blocks (Year: 2021).*

Wikipedia article for "GitHub", dated Oct. 13, 2021 (21 pages) https://en.wikipedia.org/w/index.php?title=GitHub&oldid=1049775209 (Year: 2021).*

* cited by examiner

INGESTION LAYER FOR IMPROVED SECURITY OF DISTRIBUTED INFORMATION

BACKGROUND

Aspects of the disclosure relate to improved security of distributed information. In some instances, information storage systems may fail or become otherwise unavailable, thus causing a loss of any information stored at that system. To make information resilient to such failures, information may be stored in a distributed manner, thus making the information available at additional storage locations in the event of a single failure. Such distributed storage methods, however, may create security concerns, as the information may be intercepted during transmission and/or otherwise obtained by third parties involved in the distributed storage. Accordingly, it may be advantageous to develop methods to enhance the security of information transmitted for distributed storage.

SUMMARY

Aspects of the disclosure provide effective, efficient, scalable, and convenient technical solutions that address and overcome the technical problems associated with information security. In accordance with one or more embodiments of the disclosure, a computing platform comprising at least one processor, a communication interface, and memory storing computer-readable instructions may configure a connector framework at the computing platform, wherein the connector framework is configured to: preconfigure identities of a plurality of data production systems without involvement of a third party system, and ingest information, received from the data production systems, directly into a storage layer at each of a plurality of data recipient systems, where the information may be received in a plurality of different programming languages, and the plurality of data production systems may be located in different geographic regions. The computing platform may receive, at the connector framework and from a first data production system of the data production systems, first information, where the first data production system may be located in a first geographic region. The computing platform may ingest the first information, by: 1) replicating, using the connector framework, the first information, and 2) making available, to the plurality of data recipient systems, the first information, which may cause the plurality of data recipient systems to store the replicated first information in real time as the first information is received at the connector framework, where the data production systems may be located in geographic locations other than the first geographic region.

In one or more instances, storing the replicated first information at the plurality of data recipient systems may cause the first information to be resilient against data loss due to failure of the first data production system. In one or more instances, the first information may be received via a secure sockets layer (SSL) connection between the computing platform and the first data production system.

In one or more examples, ingesting the information may include centrally ingesting the information in the plurality of different programming languages based on the preconfigured identities of the data production systems. In one or more examples, ingesting the information may be further based on a schema list corresponding to the preconfigured identities of the data production systems.

In one or more instances, the computing platform may be a multi-site storage system. In one or more instances, the connector framework may cause the information to be available to the plurality of data recipient systems in a first period of time, a second computing platform may be configured to use the third party system to perform distributed storage in a second period of time, and the second period of time may be larger than the first period of time. In one or more instances, the plurality of data recipient systems may include all data recipient systems connected to the computing platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
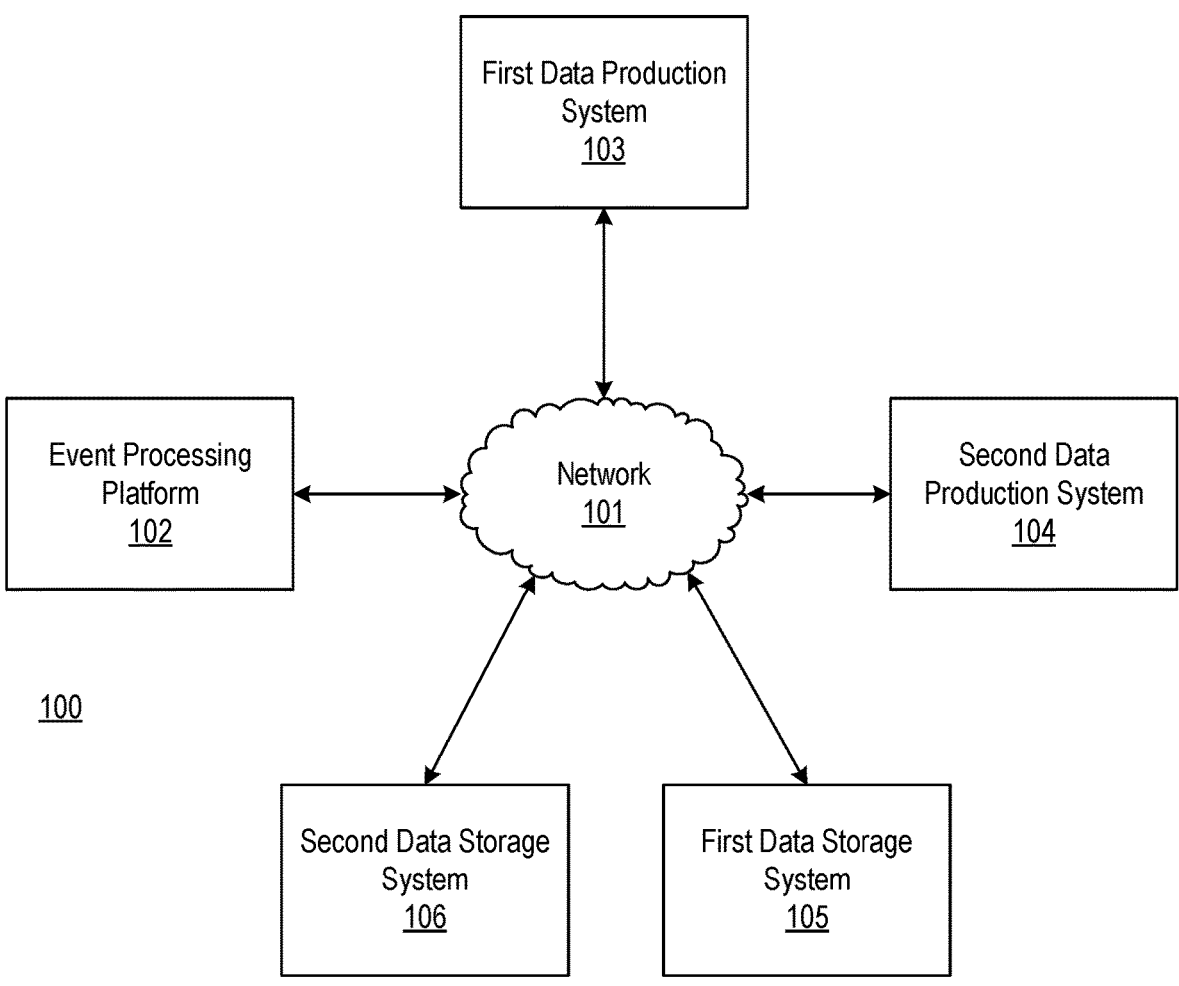
FIGS. 1A-1B depict an illustrative computing environment for improved security of distributed information in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe using a connector framework for increased information security. In some instances, the industry standard for data ingestion may primarily use extract, transform, load (ETL) tools, which might not provide the right frame of resiliency or an active-active-active node framework. The ETL implementation may have limitations for running jobs in a multisite fault tolerant mode, and may need to be configured by adding additional components of scheduling jobs to ingest data, modifying scripts of the resilient location to point correct data files, and/or providing additional coding for data reconciliation.

An event processing framework as described herein may provide a low code ETL solution that enables the data ingestion to be scalable and reliable, and can be easily integrated with the other external systems. A clustered event processing platform may have one or more worker processors running on one or multiple servers, and the worker processors may manage tasks, which distribute work among the available worker processes. An event cluster may be run on one or more servers and one or more workers on each server.

The main components of the event processing framework each may have a different role: connectors process, tasks, workers process, and/or other roles. Tasks may be further classified as source and sink tasks. A source task may contain custom code to get data from the source system and use an event producer, which may send data to event topics. A sink task may use an event consumer to poll event topics and read data, and custom code to push data to the sink system. Each sink task may have a thread, and may belong to the same consumer group for load balancing.

Accordingly, described herein is a resolution that achieves high process resiliency without adding additional parallel processes and additional nodes to the application configuration, as it uses event tasks for parallel processing in the event cluster. The cluster may have multiple resiliency features in place to rebalance one or more nodes with non-operational nodes, which may all be prebuilt within the application system configuration to help achieve high availability of the process to handle the high frequency of source and target data. The conventional approach of solving this problem may involve custom development of endpoint specific processors. In contrast, the solution described herein may generalize and standardize the acquisition and preparation of multiple endpoint data sources through a configuration based approach. In some examples, proper secure sockets layer (SSL) and/or transport layer security (TLS) certification keys may be added to source configuration property files. In doing so, no changes may be needed to existing external sources and target systems.

This method may reduce or eliminate non-resilient components during event processing functionality. For example, the process may run on the event connect cluster twenty four seven, and may process the input source data/ingest data into a connector framework producer topic as the data is ready (e.g., in some examples, immediately upon readiness of the data). The process may also synchronize the source data from the external producer to the connector framework producer topic or from the connector framework consumer topic to the external system. The process may eliminate the architecture of having separate nodes for replication of the process as it has built in connect process tasks, replication, and partitioning mechanisms that may be optimally leveraged for connector framework topics.

The method may reduce the likelihood of data loss within a high volume, high frequency event stream. The framework may have data integration within, which may use the standard industry driven connector framework connect plugins and prevent from writing any large custom code, resulting in minimum error. The eternal data from any application may be ingested into connector framework, and from connector framework to any external system by writing a few standard plugins which may be well tested and thus may reduce the possibility of error/missing data. An external stretch cluster may be mounted on the connect cluster, which may make application source data transportation from any external node less complex and readily available to the framework without writing any data movement scripts.

The method may enable the direct ingesting (e.g., in substantially real time without the involvement of third party systems) of event data from multiple sources and formats. The framework connectors may perform the source data ingestion from a given standard format to a standard format in the connector framework topic data from various sources (e.g., messaging queue (MQ) messages, comma-separated values (CSV) files, database, JavaScript Object Notation (JSON) format, and/or other sources). In these instances, information may be ingested into the connector framework topic with no or low custom code, and also to the external target with standard plugins available, thus increasing efficiency. Different plugins may be used for building new connectors for ingesting source data and exporting data from the connector framework to different formats, thus providing a standardized framework.

The standardization of the ingestion process may optimize the consumption of resources and low code. As the standard java plugins may be components of the connector framework to ingest and export data in and out of the connector framework, heavy consumption of external resources, network nodes, or network components may be prevented, and the resiliency of the components may be more efficient, thus reducing the chance of non-availability of source application data to consumer groups.

Figure 1B:
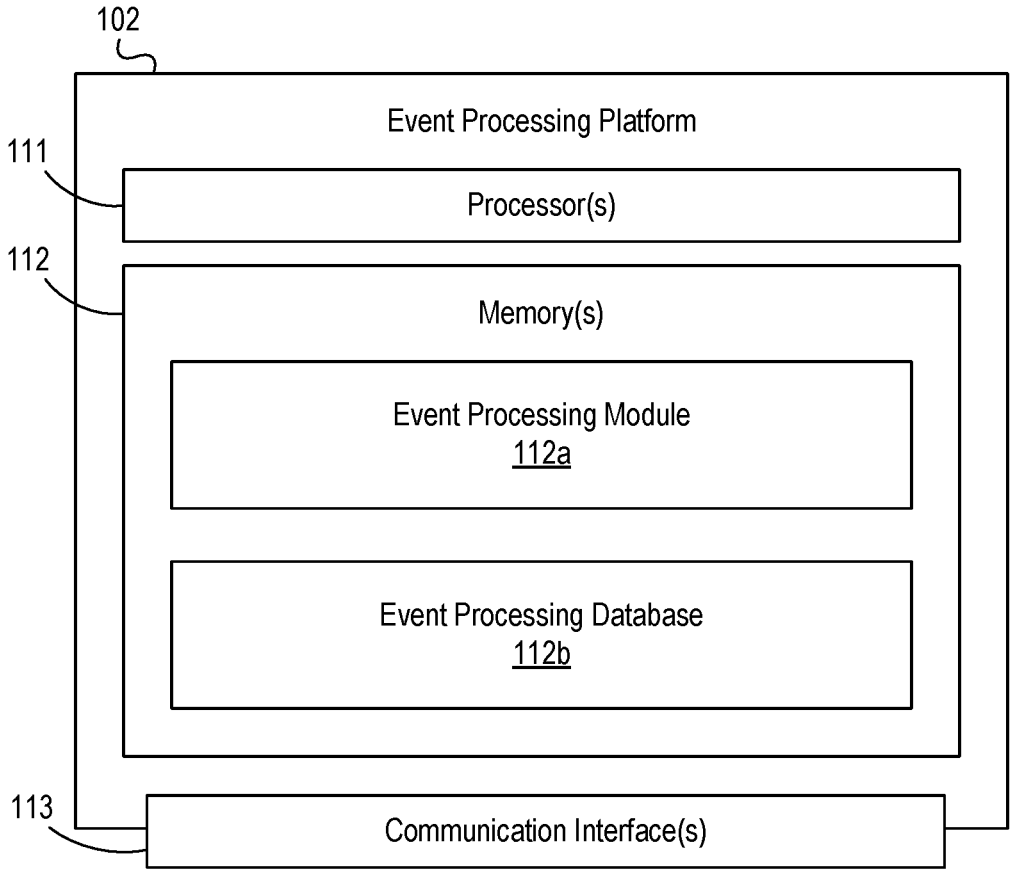

FIGS. 1A-1B depict an illustrative computing environment for improved security of distributed information in accordance with one or more example embodiments. Referring to FIG. 1A, computing environment 100 may include one or more computer systems. For example, computing environment 100 may include an event processing platform 102, first data production system 103, second data production system 104, first data storage system 105, and second data storage system 106.

As described further below, event processing platform 102 may be a computer system that includes one or more computing devices (e.g., servers, server blades, or the like) and/or other computer components (e.g., processors, memories, communication interfaces) that may be used to perform distributed real time storage of information. For example, the event processing platform 102 may include a connector framework configured to facilitate the ingestion of information from information sources in various geographic regions/languages, and to distribute this information to remaining information recipients connected to the event processing platform 102. For example, the event processing platform 102 may be a multi-site storage system.

The first data production system 103 may be a computer system that includes one or more computing devices (e.g., servers, server blades, or the like) and/or other computer components (e.g., processors, memories, communication interfaces) that may be used to send information for distributed storage across a plurality of devices across a plurality of geographic regions. For example, the first data production system 103 may be located in a first geographic region, and may send information in a first language. In some instances, the first data production system 103 may be a system that publishes files, a database, message oriented middle wear, and/or other information.

The second data production system 104 may be a computer system that includes one or more computing devices (e.g., servers, server blades, or the like) and/or other computer components (e.g., processors, memories, communication interfaces) that may be used to send information for distributed storage across a plurality of devices across a plurality of geographic regions. For example, the second data production system 104 may be located in a second geographic region, different than the first geographic region, and may send information in a second language, different than the first language. In some instances, the second data production system 104 may be a system that publishes files, a database, message oriented middle wear, and/or other information.

The first data storage system 105 may be a computer system that includes one or more computing devices (e.g., servers, server blades, or the like) and/or other computer components (e.g., processors, memories, communication interfaces) that may be used to store information (e.g., information sent by the first data production system 103, the second data production system 104, and/or otherwise). In some instances, the first data storage system 105 may be located in a third geographic region, different than the first or second geographic regions, and may be configured to store information in a third language, different than the first or second languages. In some instances, the first data storage system 105 may be a computer system that stores published files, database information, message oriented middle wear, MQ messages, CSV files, database, JSON format, and/or other information.

The second data storage system 106 may be a computer system that includes one or more computing devices (e.g., servers, server blades, or the like) and/or other computer components (e.g., processors, memories, communication interfaces) that may be used to store information (e.g., information sent by the first data production system 103, the second data production system 104, and/or otherwise). In some instances, the second data storage system 106 may be located in a fourth geographic region, different than the first, second, or third geographic regions, and may be configured to store information in a fourth language, different than the first, second, or third languages. In some instances, the second data storage system 106 may be a computer system that stores published files, database information, message oriented middle wear, MQ messages, CSV files, database, JSON format, and/or other information.

Although the first data production system 103, second data production system 104, first data storage system 105, and second data storage system 106 are described as data production/storage systems, this is for illustrative purposes only, and any of these systems may send/store information without departing from the scope of the disclosure. For example, the first data production system 103 may store received information sent from the first data storage system 105, or the like. Similarly any of these systems may, in some instances, be located in the same geographic region and/or send/store information in a common language without departing from the scope of the disclosure. Furthermore, although two data production systems and two data storage systems are depicted, this is for illustrative purposes only, and any number of data production systems/data storage systems may be included without departing from the scope of the disclosure.

Computing environment 100 also may include one or more networks, which may interconnect event processing platform 102, first data production system 103, second data production system 104, first data storage system 105, second data storage system 106, or the like. For example, computing environment 100 may include a network 101 (which may interconnect, e.g., event processing platform 102, first data production system 103, second data production system 104, first data storage system 105, second data storage system 106, or the like).

In one or more arrangements, event processing platform 102, first data production system 103, second data production system 104, first data storage system 105, and/or second data storage system 106 may be any type of computing device capable of sending and/or receiving requests and processing the requests accordingly. For example, event processing platform 102, first data production system 103, second data production system 104, first data storage system 105, second data storage system 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of event processing platform 102, first data production system 103, second data production system 104, first data storage system 105, and/or second data storage system 106 may, in some instances, be special-purpose computing devices configured to perform specific functions.

Referring to FIG. 1B, event processing platform 102 may include one or more processors 111, memory 112, and communication interface 113. A data bus may interconnect processor 111, memory 112, and communication interface 113. Communication interface 113 may be a network interface configured to support communication between event processing platform 102 and one or more networks (e.g., network 101, or the like). Memory 112 may include one or more program modules having instructions that when executed by processor 111 cause event processing platform 102 to perform one or more functions described herein and/or one or more databases that may store and/or otherwise maintain information which may be used by such program modules and/or processor 111. In some instances, the one or more program modules and/or databases may be stored by and/or maintained in different memory units of event processing platform 102 and/or by different computing devices that may form and/or otherwise make up event processing platform 102. For example, memory 112 may have, host, store, and/or include event processing module 112*a* and an event processing database 112*b*.

Event processing module 112*a* may have instructions that direct and/or cause event processing platform 102 to execute advanced techniques to provide enhanced security of distributed information. In some instances, the event processing module 112*a* may include a connector framework, configured to execute near real time distributed storage of received information. Event processing database 112*b* may store information used by event processing module 112*a* and/or event processing platform 102 to provide enhanced security of distributed information, and/or in performing other functions.

Figure 2A:
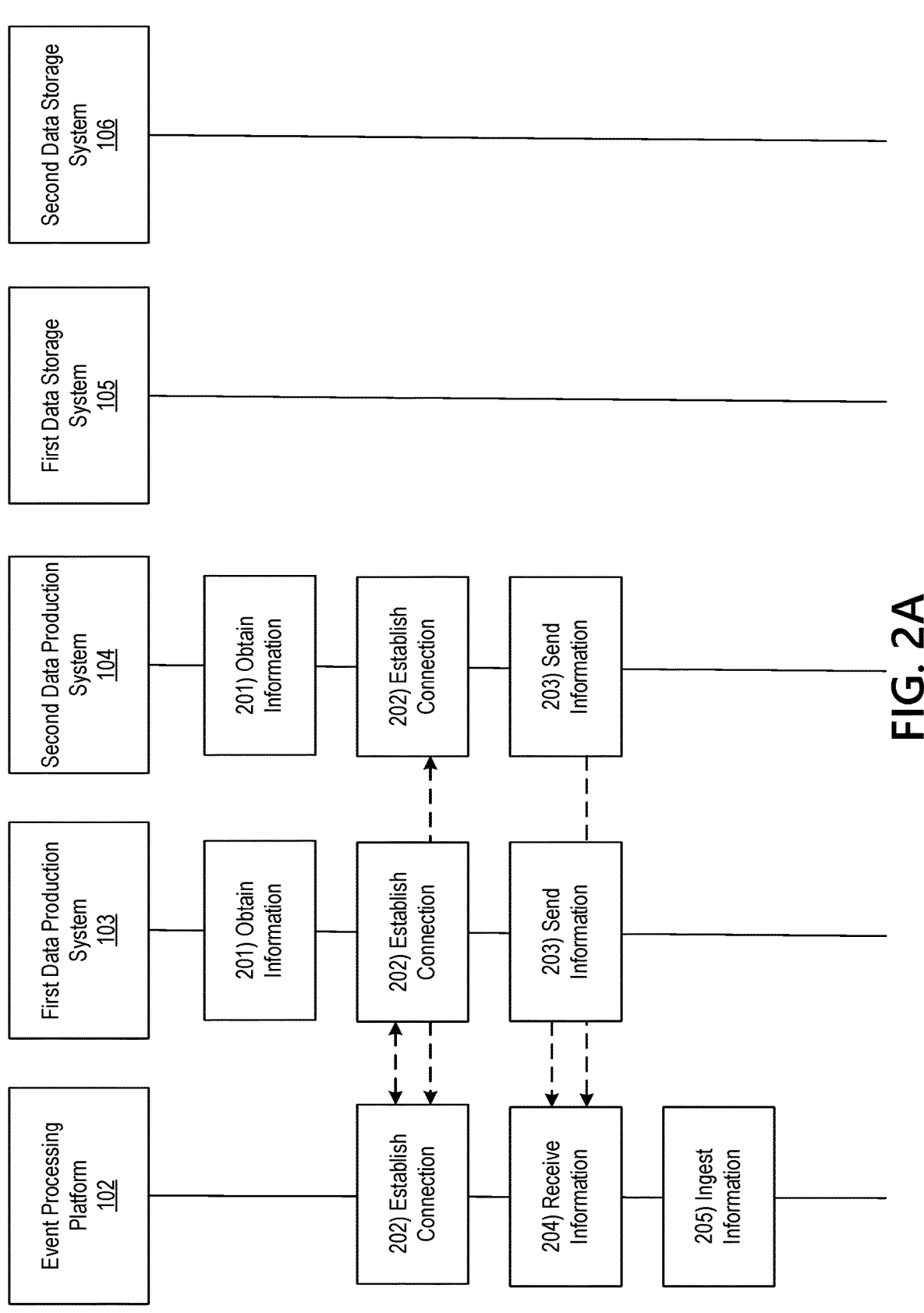
FIGS. 2A-2B depict an illustrative event sequence for improved security of distributed information in accordance with one or more example embodiments.
Figure 2B:
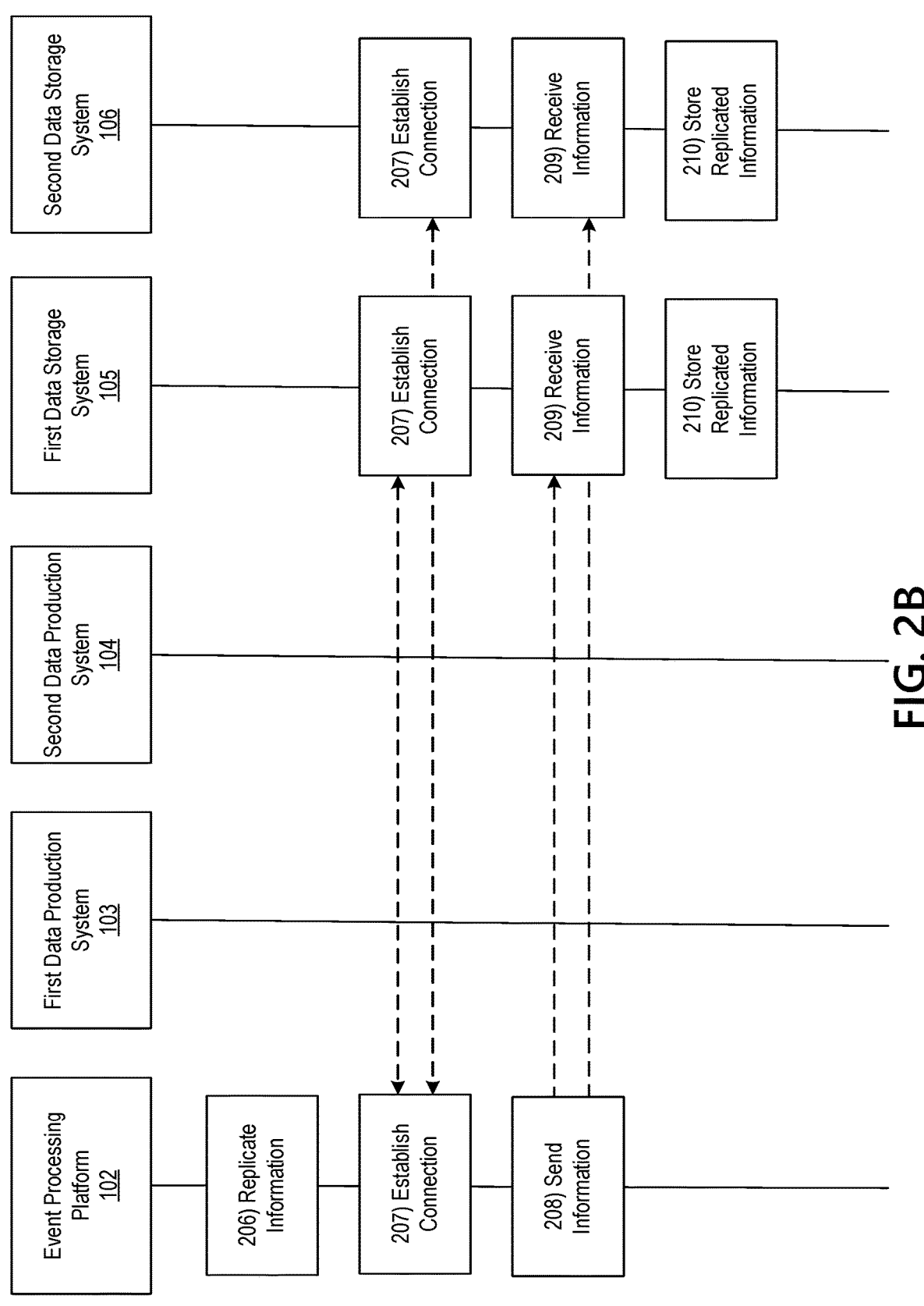

FIGS. 2A-2B depict an illustrative event sequence for improved security of distributed information in accordance with one or more example embodiments. Referring to FIG. 2A, at step 201, the first data production system 103 and/or second data production system 104 may obtain information. For example, this information may be generated at the first data production system 103 and/or second data production system 104, which may each be located in a specific geographic region. For example, the first data production system 103 may be located in a first geographic region and the second data production system 104 may be located in a second geographic region, different than the first geographic region. In some instances, rather than being produced at the first data production system 103 and/or second data production system 104 themselves, the first data production system 103 and/or the second data production system 104 may receive information from local data production systems (e.g., subsystems connected to the first data production system 103 and/or second data production system 104, which may be located in the corresponding geographic region). In some instances, the information obtained by the first data production system 103 may be in a first language and/or format (e.g., first programming language, data format, or the like), whereas the information obtained by the second data production system 104 may be in a second language and/or format, different than the first format. For example, in some instances, the first data production system 103 and/or second data production system 104 may obtain published files, database information, message oriented middle wear, MQ messages, CSV files, database, JSON format, and/or other information. In some instances, the first data production system 103 and/or the second data production system 104 may have corresponding languages, formats, and/or geographic regions.

At step 202, the first data production system 103 and the second data production system 104 may establish connections with the event processing platform 102. For example, the first data production system 103 and the second data production system 104 may establish first and second wireless data connections with the event processing platform 102 to link the first data production system 103 and the second data production system 104 to the event processing platform 102 (e.g., in preparation for providing information for distributed storage). In some instances, the first data production system 103 and the second data production system 104 may identify whether connections are already established with the event processing platform 102. If so, the first data production system 103 and the second data production system 104 might not re-establish the connections. Otherwise, if connections are not yet established with the event processing platform 102, the first data production system 103 and/or the second data production system 104 may establish the first and/or second wireless data connections as described herein.

At step 203, the first data production system 103 and/or the second data production system 104 may send first and/or second information, respectively, to the event processing platform 102. For example, the first data production system 103 and/or the second data production system 104 may send the first information and/or the second information while the first and/or second wireless data connections are established. In some instances, in sending the first information, the first data production system 103 may send information from a first geographic region (e.g., a first state, or the like), formatted according to a first language or format, whereas in sending the second information, the second data production system 104 may send information from a second geographic region (e.g., a second state, or the like), formatted according to a second language or format. In some instances, these languages and/or formats may be or include published files, database information, message oriented middle wear, MQ messages, CSV files, database, JSON format, and/or other languages/formats.

In some instances, the first data production system 103 and/or the second data production system 104 may dynamically send the information as it is received in real time. Additionally or alternatively, the first data production system 103 and/or the second data production system 104 may send the information in batches (e.g., after expiration of a predetermined time period, once a predetermined amount of information has been received, and/or otherwise). In some instances, the first data production system 103 and/or the second data production system 104 may send the information via a secure sockets layer (SSL) connection between the event processing platform 102 and the respective data production systems.

At step 204, the event processing platform 102 may receive the first and/or second information sent at step 203. For example, the event processing platform 102 may receive the first and/or second information via the communication interface 113 and while the first and/or second wireless data connection is established. In some instances, the event processing platform 102 may receive the information via the SSL connection between the event processing platform 102 and the respective data production systems.

At step 205, the event processing platform 102 may ingest the information received at step 206 (e.g., the first and/or second information). For example, the event processing platform 102 may use a connector framework, previously configured at the event processing platform 102, to ingest the information. For example, this connector framework may be a data storage layer that includes code or otherwise includes a script configured to automatically identify, based on the incoming information, a corresponding source of the information (e.g., identify that the first information is coming from the first data production system 103, and what type of system the first data production system comprises, language/format information for the first data production system 103, and/or otherwise), without receiving any further input specifying the data sources. Accordingly, by making such an identification, the connector framework may enable the event processing platform 102 to intake information in a plurality of different formats/languages and to convert it to a standardized format that may be used for transmission to other systems (which may, e.g., have different configurations). In some instances, the event processing platform 102 may use the connector framework to centrally ingest the information in a plurality of different programming languages and/or data formats based on the known or otherwise preconfigured identities of the respective data production systems. For example, the connector framework may be configured with a schema list corresponding to the various data production systems, which may enable the event processing platform 102 to identify the corresponding language/format of information arriving from the various data production systems.

In some instances, the use of such a connector framework may enable the event processing platform 102 to directly ingest information substantially in real time, while avoiding the use of third party systems to perform such identification and ingestion. In doing so, the connector framework may reduce an amount of time needed to perform the distributed storage of the information, which may e.g., increase the security of such a transfer of the information, while maintaining the benefits of the distributed storage (such as resiliency of the information in the event of a system failure at a single data storage system). For example, a given piece of information (such as the first, second, and/or other information) may be made available to the respective data recipient systems in a first period of time through use of the connector framework, whereas use of a third party system may cause the same information to be available to the same data recipient systems in a second period of time, longer than the first period of time.

Referring to FIG. 2B, at step 206, the event processing platform 102 may replicate the first and/or second information, ingested at step 205. For example, the event processing platform 102 may produce copies of the first and/or second information for distributed storage at other systems (e.g., first data storage system 105, second data storage system 106, and/or otherwise).

At step 207, the event processing platform 102 may establish connections with the first data storage system 105 and/or the second data storage system 106. For example, the event processing platform 102 may establish third and/or fourth connections with the first data storage system 105 and/or the second data storage system 106 to link the event processing platform 102 to the first data storage system 105 and/or the second data storage system 106 (e.g., in preparation for performing distributed information storage). In some instances, the event processing platform 102 may identify whether or not the third and/or fourth wireless data connections are already established. If the third and/or fourth wireless data connections are already established, the event processing platform might not re-establish the connections. If the third and/or fourth wireless data connection are not yet established, the event processing platform 102 may establish the third and/or fourth wireless data connections as described herein.

At step 208, the event processing platform 102 may send the information (e.g., the replicated first and/or second information) to the first data storage system 105, second data storage system 106, and/or any other systems connected to the event processing platform 102 (e.g., the information may be distributed to all data recipient systems connected to the event processing platform 102). For example, the event processing platform 102 may send the first and/or second information to the first data storage system 105 and/or second data storage system 106 via the communication interface 113 and while the third and/or fourth wireless data connection is established.

In some instances, the first data storage system 105 and/or the second data storage system 106 may be located in different geographic regions (e.g., different than each other and/or different than the first data production system 103 and/or the second data production system 104). For example, they may be located in different states, or other geographic regions. Additionally or alternatively, the first data storage system 105 and/or the second data storage system 106 may be configured to store information in different formats and/or languages than the first data production system 103 and/or second data production system 104. Accordingly, prior to sending the first and/or second information, the first and/or second information may be translated into the appropriate formats at the event processing platform 102 (e.g., using the connector framework). In some instances, the event processing platform 102 may also send one or more commands directing the first data storage system 105 and/or the second data storage system 106 to store the first information and/or the second information.

At step 209, the first data storage system 105 and/or second data storage system 106 may receive the copied first and/or second information sent at step 208. For example, the first data storage system 105 and/or second data storage system 106 may receive the first and/or second information while the third and/or fourth wireless data connections are established. In some instances, the first data storage system 105 and/or the second data storage system 106 may also receive the one or more commands directing them to store the first and/or second information.

At step 210, based on or in response to the one or more commands directing storage of the first and/or second information, the first data storage system 105 and/or second data storage system 106 may store the received first and/or second information. For example, the first data storage system 105 and/or second data storage system 106 may store the information in a plurality of different locations in a plurality of different languages/formats. In doing so, information may be resilient against system failures or outages at a single storage site, which may, e.g., result in data loss. However, information security may also be taken into consideration by reducing the time of transmission between an initial information source and its destinations, as well as removing the involvement of any third party devices previously needed to do so. Furthermore, in some instances, this ingestion of the information and multi-site distribution/storage may occur substantially in real time as the information is sent from the respective data production systems to the event processing platform 102.

Although only two data production systems and storage systems are described in the event sequence, this is for illustrative purposes only, and any number of data production and/or storage systems may be included without departing from the scope of the disclosure.

Figure 3:
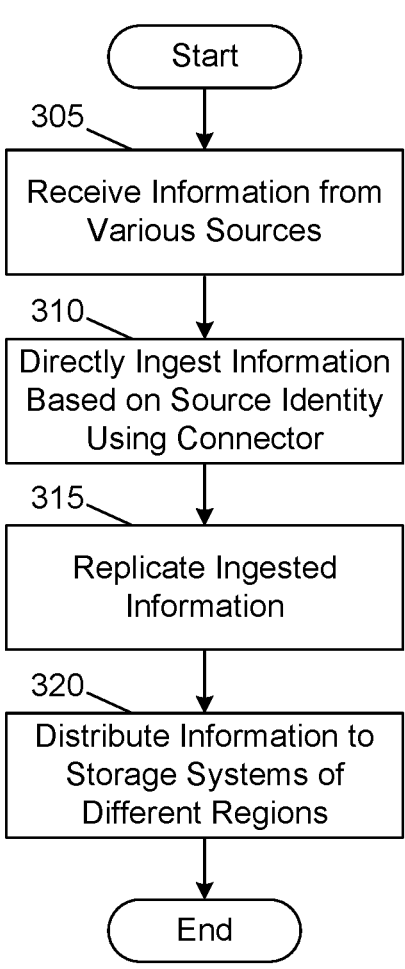
FIG. 3 depicts an illustrative method for improved security of distributed information in accordance with one or more example embodiments.

FIG. 3 depicts an illustrative method for improved security of distributed information in accordance with one or more example embodiments. Referring to FIG. 3, at step 305, a computing platform having at least one processor, a communication interface, and memory may receive information from various sources. At step 310, the computing platform may use a connector framework to directly ingest information based on its corresponding source identity. At step 315, the computing platform may replicate and/or translate the ingested information as needed. At step 320, the computing platform may distribute the information to storage systems located in different geographic regions than the corresponding sources.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
configure a connector framework at the computing platform, wherein the connector framework is configured to:
preconfigure identities of a plurality of data production systems without involvement of a third party system, and
ingest information, received from the data production systems, directly into a storage layer at each of a plurality of data recipient systems, wherein the information is received in a plurality of different programming languages, wherein the plurality of data production systems are located in different geographic regions, and wherein the ingesting the information further comprises centrally ingesting the information in the plurality of different programming languages based on the preconfigured identities of the data production systems;
receive, at the connector framework and from a first data production system of the data production systems, first information, wherein the first data production system is located in a first geographic region; and
ingest the first information, wherein ingesting the first information comprises:
replicating, using the connector framework, the first information, and
making available, to the plurality of data recipient systems, the first information, wherein making available the first information to the plurality of data recipient systems causes the plurality of data recipient systems to store the replicated first information in real time as the first information is received at the connector framework, wherein:

the data production systems are located in geographic locations other than the first geographic region, wherein:
the connector framework causes the first information to be available to the plurality of data recipient systems in a first period of time,
a second computing platform is configured to use a third party system to perform distributed storage, wherein performing the distributed storage using the third party system occurs in a second period of time, and
wherein the second period of time is larger than the first period of time.

2. The computing platform of claim 1, wherein storing the replicated first information at the plurality of data recipient systems causes the first information to be resilient against data loss due to failure of the first data production system.

3. The computing platform of claim 1, wherein the first information is received via a secure sockets layer (SSL) connection between the computing platform and the first data production system.

4. The computing platform of claim 1, wherein the ingesting the information is further based on a schema list corresponding to the preconfigured identities of the data production systems.

5. The computing platform of claim 1, wherein the computing platform comprises a multi-site storage system.

6. The computing platform of claim 1, wherein the plurality of data recipient systems includes all data recipient systems connected to the computing platform.

7. The computing platform of claim 1, wherein the information includes message queue (MQ) messages, comma-separated values (CSV) files, and JavaScript Object Notation (JSON) format files.

8. A method comprising:
at a computing platform comprising at least one processor, a communication interface, and memory:
configuring a connector framework at the computing platform, wherein the connector framework is configured to:
preconfigure identities of a plurality of data production systems without involvement of a third party system, and
ingest information, received from the data production systems, directly into a storage layer at each of a plurality of data recipient systems, wherein the information is received in a plurality of different programming languages, wherein the plurality of data production systems are located in different geographic regions, and wherein the ingesting the information further comprises centrally ingesting the information in the plurality of different programming languages based on the preconfigured identities of the data production systems;
receiving, at the connector framework and from a first data production system of the data production systems, first information, wherein the first data production system is located in a first geographic region; and
ingesting the first information, wherein ingesting the first information comprises:
replicating, using the connector framework, the first information, and
making available, to the plurality of data recipient systems, the first information, wherein making available the first information to the plurality of data recipient systems causes the plurality of data recipient systems to store the replicated first information in real time as the first information is received at the connector framework, wherein:

the data production systems are located in geographic locations other than the first geographic region, wherein:

the connector framework causes the first information to be available to the plurality of data recipient systems in a first period of time, a second computing platform is configured to use a third party system to perform distributed storage, wherein performing the distributed storage using the third party system occurs in a second period of time, and wherein the second period of time is larger than the first period of time.

9. The method of claim 8, wherein storing the replicated first information at the plurality of data recipient systems causes the first information to be resilient against data loss due to failure of the first data production system.

10. The method of claim 8, wherein the first information is received via a secure sockets layer (SSL) connection between the computing platform and the first data production system.

11. The method of claim 8, wherein the ingesting the information is further based on a schema list corresponding to the preconfigured identities of the data production systems.

12. The method of claim 8, wherein the computing platform comprises a multi-site storage system.

13. The method of claim 8, wherein the plurality of data recipient systems includes all data recipient systems connected to the computing platform.

14. One or more non-transitory computer-readable media storing instructions that, when executed by a computing platform comprising at least one processor, a communication interface, and memory, cause the computing platform to:

configure a connector framework at the computing platform, wherein the connector framework is configured to:

preconfigure identities of a plurality of data production systems without involvement of a third party system, and ingest information, received from the data production systems, directly into a storage layer at each of a plurality of data recipient systems, wherein the information is received in a plurality of different programming languages, wherein the plurality of data production systems are located in different geographic regions, and wherein the ingesting the information further comprises centrally ingesting the information in the plurality of different programming languages based on the preconfigured identities of the data production systems;

receive, at the connector framework and from a first data production system of the data production systems, first information, wherein the first data production system is located in a first geographic region; and ingest the first information, wherein ingesting the first information comprises:

replicating, using the connector framework, the first information, and making available, to the plurality of data recipient systems, the first information, wherein making available the first information to the plurality of data recipient systems causes the plurality of data recipient systems to store the replicated first information in real time as the first information is received at the connector framework, wherein:

the data production systems are located in geographic locations other than the first geographic region, wherein:

the connector framework causes the first information to be available to the plurality of data recipient systems in a first period of time, a second computing platform is configured to use a third party system to perform distributed storage, wherein performing the distributed storage using the third party system occurs in a second period of time, and wherein the second period of time is larger than the first period of time.

15. The one or more non-transitory computer-readable media of claim 14, wherein storing the replicated first information at the plurality of data recipient systems causes the first information to be resilient against data loss due to failure of the first data production system.

16. The one or more non-transitory computer-readable media of claim 14, wherein the first information is received via a secure sockets layer (SSL) connection between the computing platform and the first data production system.

17. The one or more non-transitory computer-readable media of claim 14, wherein the ingesting the information is further based on a schema list corresponding to the preconfigured identities of the data production systems.

18. The one or more non-transitory computer-readable media of claim 14, wherein the computing platform comprises a multi-site storage system.

* * * * *